(12) United States Patent
Blais

(10) Patent No.: US 7,486,840 B2
(45) Date of Patent: *Feb. 3, 2009

(54) MAP IMAGE OBJECT CONNECTIVITY

(75) Inventor: Marc Blais, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 833 days.

This patent is subject to a terminal disclaimer.

(21) Appl. No.: 11/015,305

(22) Filed: Dec. 20, 2004

(65) Prior Publication Data

US 2005/0267855 A1 Dec. 1, 2005

Related U.S. Application Data

(60) Provisional application No. 60/574,924, filed on May 28, 2004.

(51) Int. Cl.
*G06K 9/36* (2006.01)
(52) U.S. Cl. ...................................... 382/284
(58) Field of Classification Search ................. 382/108, 382/284, 174, 176, 190, 206, 285, 316; 701/1, 701/3–5, 8–9, 13–14, 207, 300–302; 345/423–429, 345/538, 552, 582, 586, 588, 211; 340/945, 340/951, 973
See application file for complete search history.

(56) References Cited

U.S. PATENT DOCUMENTS

| | | | |
|---|---|---|---|
| 4,876,651 A | 10/1989 | Dawson et al. | |
| 4,903,216 A | 2/1990 | Huss et al. | |
| 4,931,954 A | 6/1990 | Honda et al. | |
| 4,970,682 A | 11/1990 | Beckwith, Jr. et al. | |
| 5,041,992 A | 8/1991 | Cunningham et al. | |
| 5,086,396 A | 2/1992 | Waruszewski, Jr. | |
| 5,179,638 A | 1/1993 | Dawson et al. | |
| 5,222,205 A | 6/1993 | Larson et al. | |
| 5,278,946 A | 1/1994 | Shimada et al. | |
| 5,319,744 A | 6/1994 | Kelly et al. | |
| 5,355,442 A | 10/1994 | Paglieroni et al. | |
| 5,428,744 A | 6/1995 | Webb et al. | |
| 5,506,947 A | 4/1996 | Taubin | |
| 5,526,260 A | 6/1996 | Kodet et al. | |
| 5,574,915 A | 11/1996 | Lemon et al. | |

(Continued)

FOREIGN PATENT DOCUMENTS

EP 0 337 338 B1 10/1989

(Continued)

OTHER PUBLICATIONS

Notice of Allowance dated May 29, 2007 for U.S. Appl. No. 11/062,693.

(Continued)

*Primary Examiner*—Sherali Ishrat
(74) *Attorney, Agent, or Firm*—Miles & Stockbridge PC; James T. Carmichael

(57) ABSTRACT

A system and method for creating a connectivity framework between map image objects and map data objects in an object oriented computer environment. The connectivity framework may provide a flexible and efficient architecture for generating multiple map images from one or more map data sources. The map image objects may be coupled to map data objects and map projection objects.

22 Claims, 6 Drawing Sheets

U.S. PATENT DOCUMENTS

| | | | |
|---|---|---|---|
| 5,630,035 | A | 5/1997 | Gjullin et al. |
| 5,631,640 | A | 5/1997 | Deis et al. |
| 5,673,376 | A | 9/1997 | Ray et al. |
| 5,767,857 | A * | 6/1998 | Neely .................. 345/427 |
| 5,781,195 | A | 7/1998 | Marvin |
| 5,831,624 | A | 11/1998 | Tarolli et al. |
| 5,838,262 | A | 11/1998 | Kershner |
| 6,034,694 | A | 3/2000 | Evans et al. |
| 6,047,236 | A | 4/2000 | Hancock et al. |
| 6,057,861 | A | 5/2000 | Lee et al. |
| 6,097,397 | A | 8/2000 | Lee |
| 6,124,864 | A | 9/2000 | Madden et al. |
| 6,128,019 | A | 10/2000 | Crocker, III et al. |
| 6,169,550 | B1 | 1/2001 | Jain |
| 6,184,894 | B1 | 2/2001 | Rosman et al. |
| 6,191,791 | B1 | 2/2001 | Dyer et al. |
| 6,191,795 | B1 | 2/2001 | Liepa |
| 6,222,555 | B1 | 4/2001 | Christofferson et al. |
| 6,232,980 | B1 | 5/2001 | Liepa |
| 6,262,741 | B1 | 7/2001 | Davies |
| 6,288,721 | B1 | 9/2001 | Donoghue et al. |
| 6,304,268 | B1 | 10/2001 | Iourcha et al. |
| 6,308,132 | B1 | 10/2001 | Wilson et al. |
| 6,317,690 | B1 | 11/2001 | Gia |
| 6,320,592 | B1 | 11/2001 | Evans et al. |
| 6,346,948 | B1 | 2/2002 | Evans et al. |
| 6,401,038 | B2 | 6/2002 | Gia |
| 6,404,431 | B1 | 6/2002 | Farmer |
| 6,430,548 | B1 | 8/2002 | Deis et al. |
| 6,434,481 | B2 | 8/2002 | Winter et al. |
| 6,476,813 | B1 | 11/2002 | Hansen |
| 6,501,482 | B1 | 12/2002 | Rosman et al. |
| 6,529,821 | B2 | 3/2003 | Tomasi et al. |
| 6,559,853 | B1 * | 5/2003 | Hashimoto et al. .......... 345/582 |
| 6,570,578 | B1 | 5/2003 | Smirnov et al. |
| 6,583,790 | B1 | 6/2003 | Wolters |
| 6,593,947 | B1 | 7/2003 | Ashe et al. |
| 6,600,489 | B2 | 7/2003 | Cook |
| 6,618,049 | B1 | 9/2003 | Hansen |
| 6,646,647 | B1 | 11/2003 | Surgutchik et al. |
| 6,661,424 | B1 | 12/2003 | Alcorn et al. |
| 6,677,957 | B2 | 1/2004 | Grzeszczuk et al. |
| 6,697,062 | B1 | 2/2004 | Cabral et al. |
| 6,707,452 | B1 | 3/2004 | Veach |
| 7,242,407 | B2 * | 7/2007 | Blais .................. 345/582 |
| 2001/0020948 | A1 | 9/2001 | Piazza et al. |
| 2001/0024203 | A1 | 9/2001 | Yamada et al. |
| 2002/0033821 | A1 | 3/2002 | Sfarti |
| 2002/0158897 | A1 | 10/2002 | Besaw et al. |
| 2003/0034981 | A1 | 2/2003 | Wada |
| 2003/0191766 | A1 | 10/2003 | Elin |
| 2004/0007121 | A1 | 1/2004 | Graves et al. |
| 2004/0015512 | A1 | 1/2004 | Ashe et al. |
| 2004/0030492 | A1 | 2/2004 | Fox et al. |
| 2005/0267652 | A1 | 12/2005 | Allstadt et al. |
| 2005/0267854 | A1 | 12/2005 | Blais |

FOREIGN PATENT DOCUMENTS

| | | |
|---|---|---|
| WO | WO 95/19544 | 7/1995 |
| WO | WO 95/19545 | 7/1995 |
| WO | WO 95/19546 | 7/1995 |

OTHER PUBLICATIONS

Notice of Allowance dated Mar. 6, 2007 for U.S. Appl. No. 10/957,621.

Office Action dated Jun. 2, 2008 in U.S. Appl. No. 11/014,705.

*Three-Dimensional Intervisibility Algorithm*, IBM Technical Disclosure Bulletin, Jul. 1991, pp. 61-66.

*Terrain Exposure Factor*, IBM Technical Disclosure Bulletin, Jan. 1994, pp. 649-652.

* cited by examiner

MAP IMAGE OBJECT CONNECTIVITY

This application claims the benefit of U.S. Provisional Application Ser. No. 60/574,924, filed May 28, 2004, which is incorporated herein by reference.

The present invention relates generally to object oriented computer graphics and, more particularly, to object oriented software for digital maps.

Digital map images may be generated from a source of map data. It may be desirable to generate multiple map images from a single data source and for each image to have different characteristics depending on the contemplated use of the image. It may also be desirable to provide connectivity between map image objects and map data and map projection objects.

Conventional map image generation software may have associations between a map image and a map database, which may be limited in number and type. Further, these associations may be coded into the software and may not be readily adapted or changed.

A system and method of map image object connectivity in accordance with the present invention may overcome the limitations of the conventional methods of generating map images.

Briefly, in an exemplary embodiment of the present invention, three objects are created, a map data object, a map image object, and a map projection object. The map data object provides members and methods to access a map data source. The map image object provides members and methods to generate map images based on map data and a map projection. The map projection object provides methods for projecting map data into a map image having a specified projection. The map image object may be connected with any map data source or any other map image object. The map data source may be a map database or another map data object.

In an exemplary embodiment of a method for creating connectivity between map data and a map image in an object oriented computer system, in accordance with the present invention, first, a map data object is created. Then, a map image object and a map projection object are created.

The map data object is connected to a map data source by invoking a map data connection method of the map data object and providing a map data source identifier. The map image object is connected to the map data object by invoking a map data selection method of the map image object and providing an identifier for the map data object. Finally, invoking a map image rendering method of the map image object creates a map image.

The exemplary embodiment of the present invention described above provides for any combination of map images to be associated with map data objects or other map image objects. Further, the system and method of the present invention may provide a savings of processing time and memory during the generation of map images.

BRIEF DESCRIPTION OF THE DRAWINGS

The present invention will be described with reference to the accompanying drawings, wherein.

DETAILED DESCRIPTION

Figure 1:
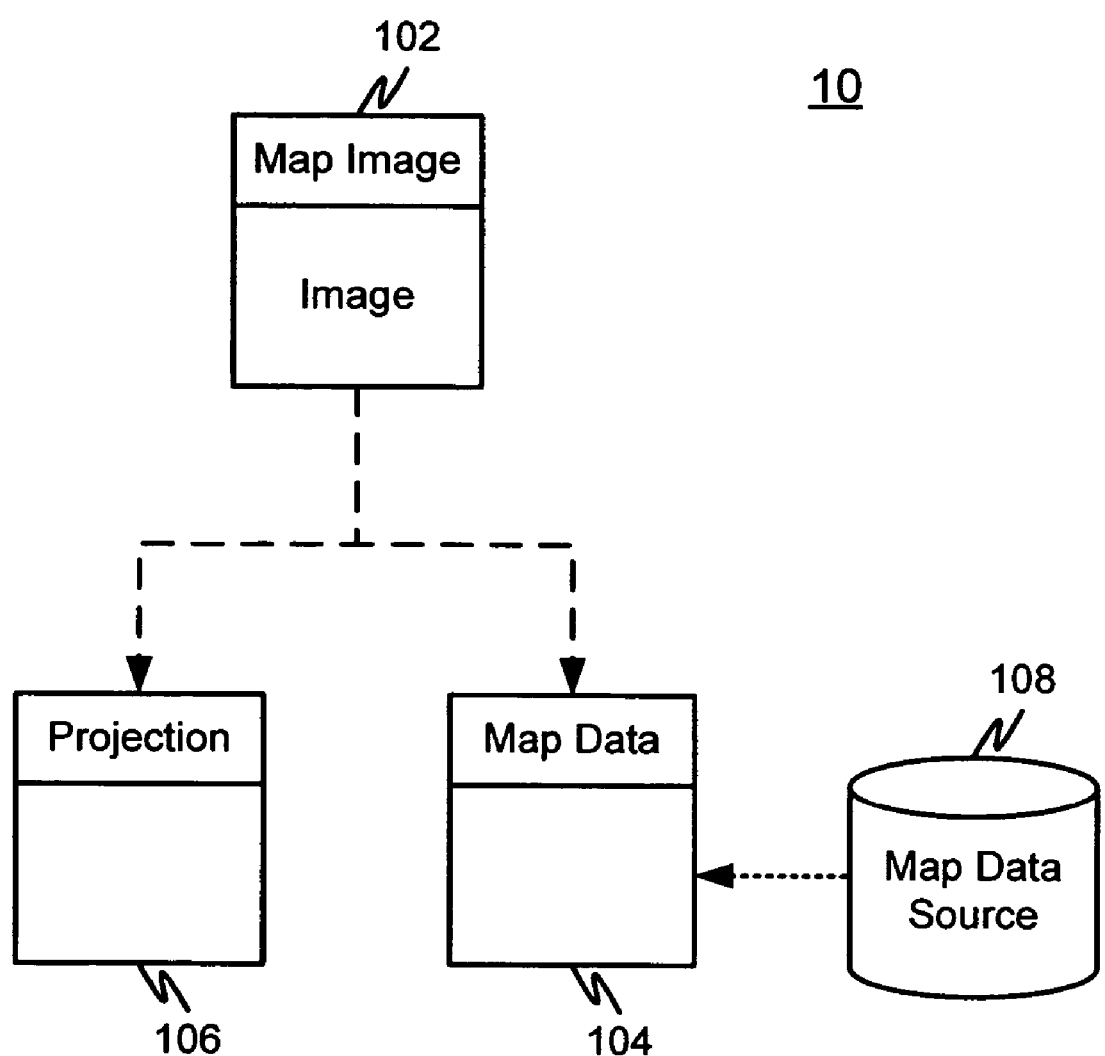
FIG. 1 is a block diagram of map object connectivity in accordance with the present invention.

In accordance with the present invention, a system and method of map image object connectivity is provided. The system and method of map image connectivity in accordance with the present invention may provide a flexible and efficient framework from which to develop digital map applications. These digital map applications may be used in a variety of platforms, such as, for example, mapping terminals, land vehicles, ships, fixed wing or rotary wing aircraft, unmanned aerial vehicles, command and control centers, spacecraft, and/or the like.

Further, the system and method of map image object connectivity may be practiced in a client-server computer environment. The map image object, map data object, and map projection object may each be distributed onto different processors, or they may be co-located. The connections between the objects may be software connections within a processor, may be wired connections, may be wireless connections, or a combination of the above in a distributed environment.

The systems and methods of the present invention are illustrated below in terms of specific exemplary embodiments. However, it should be appreciated that the systems and methods of the present invention are not limited to the specific exemplary embodiment shown and this invention may be practiced in various configurations in accordance with a contemplated use of the invention.

In an exemplary embodiment, the MapData class (the map data object base class) provides an API (Application Program Interface) for derived map database classes. The MapData class is abstract, meaning that it cannot be used by itself. It is a building block to be used when creating an implementation for a particular kind of map data.

Most of the MapData API is defined as pure virtual methods. These virtual methods must be implemented when creating a derived class for a particular kind of map data. The presence of the [virtual] label in the table below denotes a virtual method that has a default implementation in this class, [pure virtual] denotes a virtual method with no default implementation, and [protected] indicates that the method can only be accessed by derived classes. Table 1, below, contains an exemplary embodiment of the methods that may be found in the MapData API:

TABLE 1

| Connect (specify) the location of a map database | |
|---|---|
| CanConnectToMapObject( ) | [pure virtual] |
| ConnectToMapObject( ) | [pure virtual] |
| CanConnectToMultipleDbPaths( ) | [pure virtual] |
| ConnectToDbPath( ) | [pure virtual] |
| Disconnect( ) | [pure virtual] |
| Query the type of map data supported and the availability of data. | |
| GetMapTypeLongString( ) | [pure virtual] |
| GetMapTypeString( ) | [pure virtual] |

TABLE 1-continued

Query the available map scales and initialize to a particular map scale.

| | |
|---|---|
| GetNumberScales( ) | [pure virtual] |
| GetScaleIndex( ) | [pure virtual] |
| GetScaleString( ) | [pure virtual] |
| GetScaleStringLong( ) | [pure virtual] |
| GetScaleStringNumeric( ) | [pure virtual] |
| IsValidScale( ) | [pure virtual] |
| SetScale( ) | [pure virtual] |

Query the available feature data, and initialize features.

| | |
|---|---|
| FeaturesHaveColor( ) | [pure virtual] |
| GetFeatureActivation( ) | [pure virtual] |
| GetFeatureClass( ) | [pure virtual] |
| GetFeatureCode( ) | [pure virtual] |
| GetFeatureColor( ) | [pure virtual] |
| GetFeatureName( ) | [pure virtual] |
| GetTotalNumberFeatures( ) | [pure virtual] |
| IsValidFeatureCode( ) | [pure virtual] |
| IsValidFeatureName( ) | [pure virtual] |
| SetFeatureActivation( ) | [pure virtual] |
| SetFeatureColor( ) | [pure virtual] |

Query and initialize protections.

| | |
|---|---|
| CanSetProjection( ) | [pure virtual] |
| CloneProjection( ) | [pure virtual] |
| GetProjection( ) | [pure virtual] |
| HaveProjection( ) | [pure virtual] |
| MakeProjection( ) | [pure virtual] |

Initialize and request a data load, and query data availability.

| | |
|---|---|
| AbortLoad( ) | [pure virtual] |
| CanSetSizeCells( ) | [pure virtual] |
| CanQueryDataAvail( ) | [pure virtual] |
| ClearReadLock( ) | [virtual] |
| GetUpdateCount( ) | [inline] |
| HaveData( ) | [pure virtual] |
| Load( ) | |
| LoadData( ) | [protected, pure virtual] |
| SetReadLock( ) | [virtual] |
| SetSizeCells( ) | [pure virtual] |
| SetSizeDegrees( ) | [pure virtual] |

An exemplary implementation of the MapData class may be responsible for reading a particular type of map data from disk files and storing that data into memory. The format of the data storage may be left to the implementer of the derived class.

Derived classes must implement all pure virtual API methods. Other virtual methods must be implemented if the default behavior does not meet the needs of the derived class. Derived classes should initialize to some default state, such that a minimum number of method calls are required to accomplish loading data into memory.

In an exemplary embodiment, the minimal set of methods required to accomplish this may be:

ConnectToDbPath( . . . ) or ConnectToMapObject( . . . )
    SetSizeDegrees( . . . ) or SetSizeCells( . . . )
    SetScale( . . . )
    Load( . . . )

In an exemplary embodiment, the responsibility of the MapImage class may be to provide an API for map image classes. The MapImage class may not be not abstract, which means that it may be used as a complete object. By itself, the MapImage class cannot create a map image because it is not associated with any particular kind of map data. However, a map image object may contain a map image by using associations that can be set up between map images. The MapImage class may be a building block to be used when creating an implementation for a particular kind of map data.

The MapImage API has some methods that are implemented within the class, and some API methods that are defined as virtual methods. The API methods implemented within this class have to do with the providing initialization and access to the image and establishing relationships between different MapImage objects.

The API methods that are defined as virtual are methods that need to be implemented when creating a derived class for a particular kind of map data.

Table 2, below, contains an exemplary embodiment of the MapImage class methods.

TABLE 2

Initialize the image.

| | |
|---|---|
| Clear( ) | |
| GetBackgroundColor( ) | |
| GetBytesPerPixel( ) | |
| GetBytesPerPixel( ) | |
| GetClut( ) | |
| GetImagePointer( ) | |
| GetImageSize( ) | |
| GetImageType( ) | |
| GetSubImage( ) | |
| SetBackgroundColor( ) | |
| SetClut( ) | |
| SetImageMemory( ) | |
| SetImageSize( ) | |
| SetImageType( ) | |

Establish associations with map data and other map images, and setup projection.

| | |
|---|---|
| GetMapData( ) | [virtual] |
| SetMapData( ) | [virtual] |
| GetProjection( ) | |
| CreateProjection( ) | |
| SetBaseImage( ) | |
| SetProjection( ) | |

Initialize image processing and generate images.

| | |
|---|---|
| CanDither( ) | [virtual] |
| GenerateImage( ) | [protected, virtual] |
| GetImageAttributes( ) | [virtual] |
| GetImageObject( ) | |
| GetUpdateCount( ) | [inline] |
| MakeImage( ) | |
| UseDitherMap( ) | [virtual] |

An exemplary implementation of the MapImage class is responsible for rendering data for a particular type of MapData object into an image. The format of the image is left to the implementer of the derived class.

Derived classes must implement all pure virtual API methods. Other virtual methods must be implemented if the default behavior does not meet the needs of the derived class. Derived classes should initialize to some default state, such that a minimum number of method calls are required to accomplish loading data into memory. The minimal set of method calls required to accomplish this may be:

SetImageType( . . . )
    SetImageSize( . . . )
    SetMapData( . . . )
    MakeImage( . . . )

In an exemplary embodiment, it is the responsibility of the Projection class to provide an API for projection classes. The Projection class is abstract, meaning that it cannot be used by itself. It is a building block to be used when creating an implementation for a particular kind of projection.

The Projection API has some methods that are implemented within the class, and some API methods that are defined as virtual methods. The API methods implemented are methods that are the same regardless of the type of projection, or they use specific implementations of other methods.

The API methods that are defined as virtual are methods that need to be implemented when creating a derived class for a particular kind of projection.

The presence of the [virtual] label in the table below denotes a virtual method that has a default implementation in this class, [pure virtual] denotes a virtual method with no default implementation, and the [protected] label indicates that derived classes can only access the method. Table 3, below, lists the methods of an exemplary embodiment of the MapProjection class.

TABLE 3

| Initialize and query the protection. | |
|---|---|
| CanSetDatum( ) | [pure virtual] |
| Compute( ) | [protected, pure virtual] |
| GetDatum( ) | |
| GetEllipsoid( ) | |
| GetOrigin( ) | |
| GetRangeScale( ) | |
| GetBounds( ) | [pure virtual] |
| GetReferencePosition( ) | |
| GetTypeString( ) | |
| FetchTypeString( ) | [protected, pure virtual] |
| SetDatum( ) | |
| SetDatum( ) | |
| SetNumericScale( ) | |
| SetOrigin( ) | |
| SetRangeScaleDegrees( ) | |
| SetRangeScaleMeters( ) | |
| SetReferencePosition( ) | |
| ValidLatLonDeg( ) | [inline] |
| Perform conversions | |
| ArcsecsToMeters( ) | |
| ArcsecsToProjection( ) | [pure virtual] |
| ArcsecsToProjection( ) | [pure virtual] |
| ArcsecsWGS84ToProjection( ) | |
| ArcsecsWGS84ToProjection( ) | |
| DegreesLocalToWGS84( ) | |
| DegreesToMeters( ) | |
| DegreesToProjection( ) | [pure virtual] |
| DegreesToProjection( ) | [pure virtual] |
| DegreesWGS84ToLocal( ) | |
| DegreesWGS84ToProjection( ) | |
| DegreesWGS84ToProjection( ) | |
| MetersToArcsecs( ) | |
| MetersToDegrees( ) | |
| MetersToProjection( ) | |
| MetersToProjection( ) | |
| ProjectionToArcsecs( ) | [pure virtual] |
| ProjectionToArcsecs( ) | [pure virtual] |
| ProjectionToArcsecsWGS84( ) | |
| ProjectionToArcsecsWGS84( ) | |
| ProjectionToDegrees( ) | [pure virtual] |
| ProjectionToDegrees( ) | [pure virtual] |
| ProjectionToDegreesWGS84( ) | |
| ProjectionToDegreesWGS84( ) | |
| ProjectionToMeters( ) | |
| ProjectionToMeters( ) | |

An exemplary implementation of the Projection class is responsible for maintaining the conversion algorithms that the projection defines Derived classes must implement all pure virtual API methods. Derived classes should initialize to some default state such that a minimum number of method calls are required to use the projection. The minimal set of method calls required to accomplish this may be:

SetOrigin( . . . )
SetReferencePosition( . . . )
SetRangeScale( . . . )

FIG. 1 is a block diagram of map objects in accordance with the present invention. In particular, a map object connectivity system 10 comprises a map image object 102, a map data object 104, a map projection object 106, and a map data source 108. The map image object 102 is connected to the map data object 104 and the map projection object 106. The map data object 104 is connected to the map data source 108.

In operation, the map image object 102 and the map data object 104 are created. The map data object 104 is connected to the map data source 108. The map data object 104 is connected to the map image object 102. The map projection object 106 is connected to the map image object 102.

The map image object 102 requests map data from the map data object 104 and then generates a map image by projecting the map data using the map projection object 106.

Figure 2:
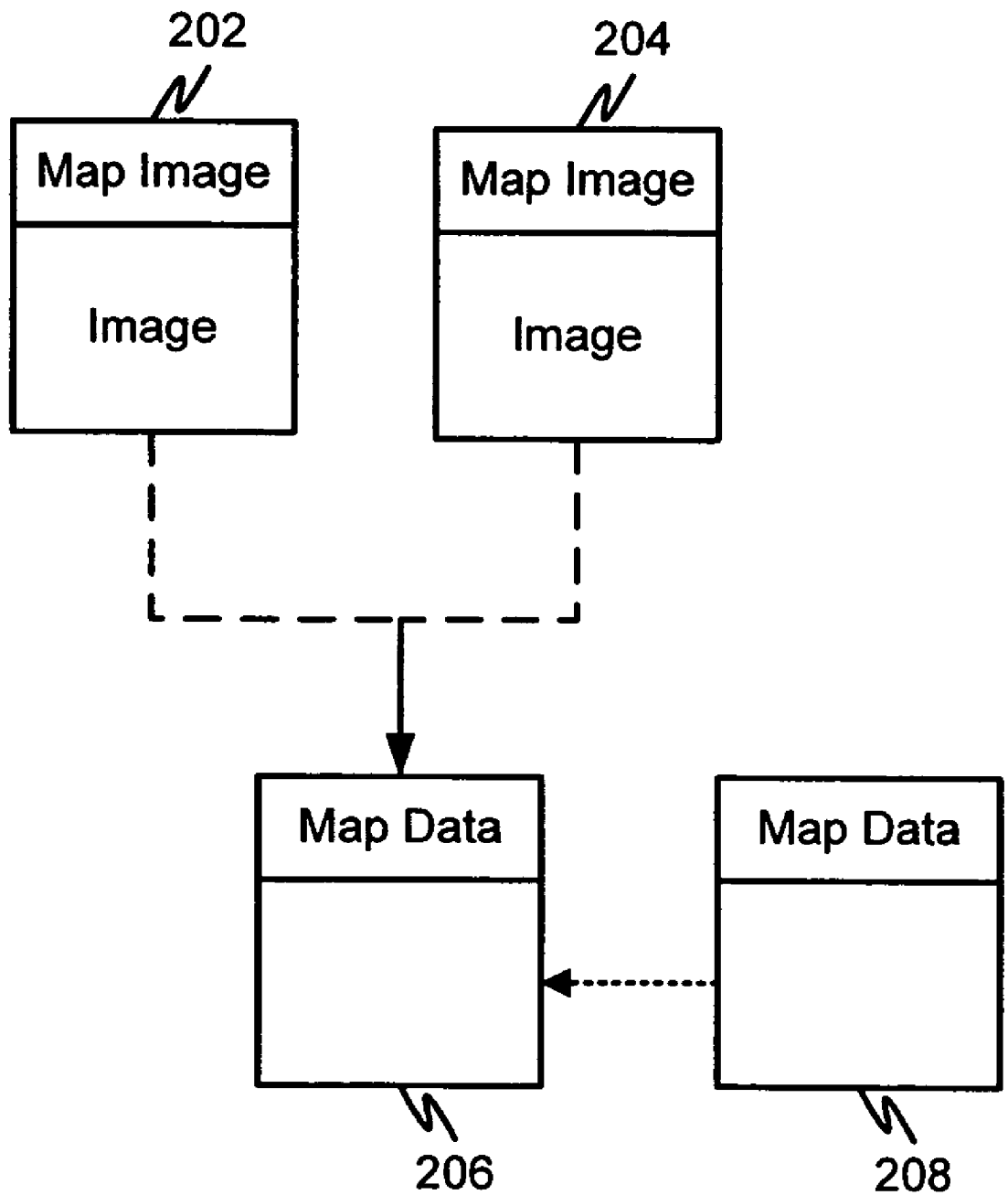
FIG. 2 is a block diagram of an exemplary embodiment of map object connectivity in accordance with the present invention.

FIG. 2 is a block diagram of an exemplary embodiment of map object connectivity in accordance with the present invention. In particular, a first map image object 202 and a second map image object 204 are connected to a single map data object 206. The map data object 206 is connected to a map data source 208.

In operation, the first map image object 202 may generate a first map image based on data received from the map data object 206. The second map image object 204 may generate a second map image which may have different characteristics from the first map image. The second map image is based on data received from the map data object 206. The map image objects (202 and 204) may use the same map projection object or may use different map projection objects.

The map image objects may be of different image type or of the same image type. Although the map image objects may be of the same image type, they may still differ in other characteristics, such as, for example, geographic coverage, image size, image format, scale, and/or any other configurable detail of the class from which the map image object is derived.

Further, while two map image objects are shown connected to a single map data object, it should be appreciated that any number of map image objects may be connected to a single map data object.

Figure 3:
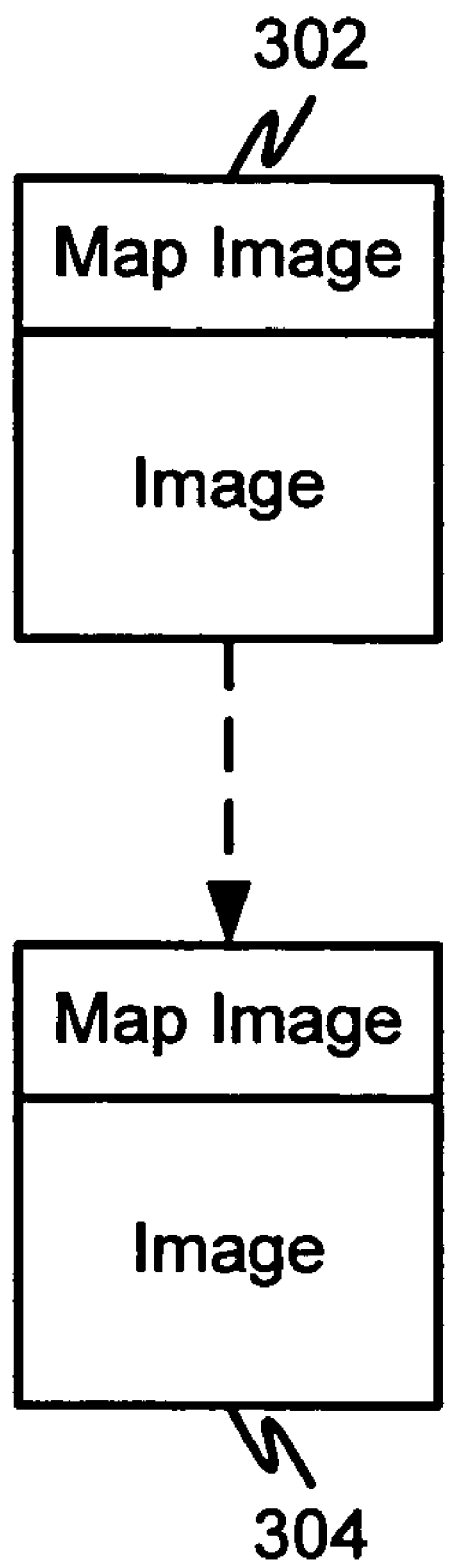
FIG. 3 is a block diagram of an exemplary embodiment of map object connectivity in accordance with the present invention.

FIG. 3 is a block diagram of an exemplary embodiment of map object connectivity in accordance with the present invention. In particular, a first map image object 302 is connected to a second map image object 304. In this configuration the first map image object 302 may generate a map image and store the map image in the memory space allocated to the map image of the second map image object 304.

Figure 4:
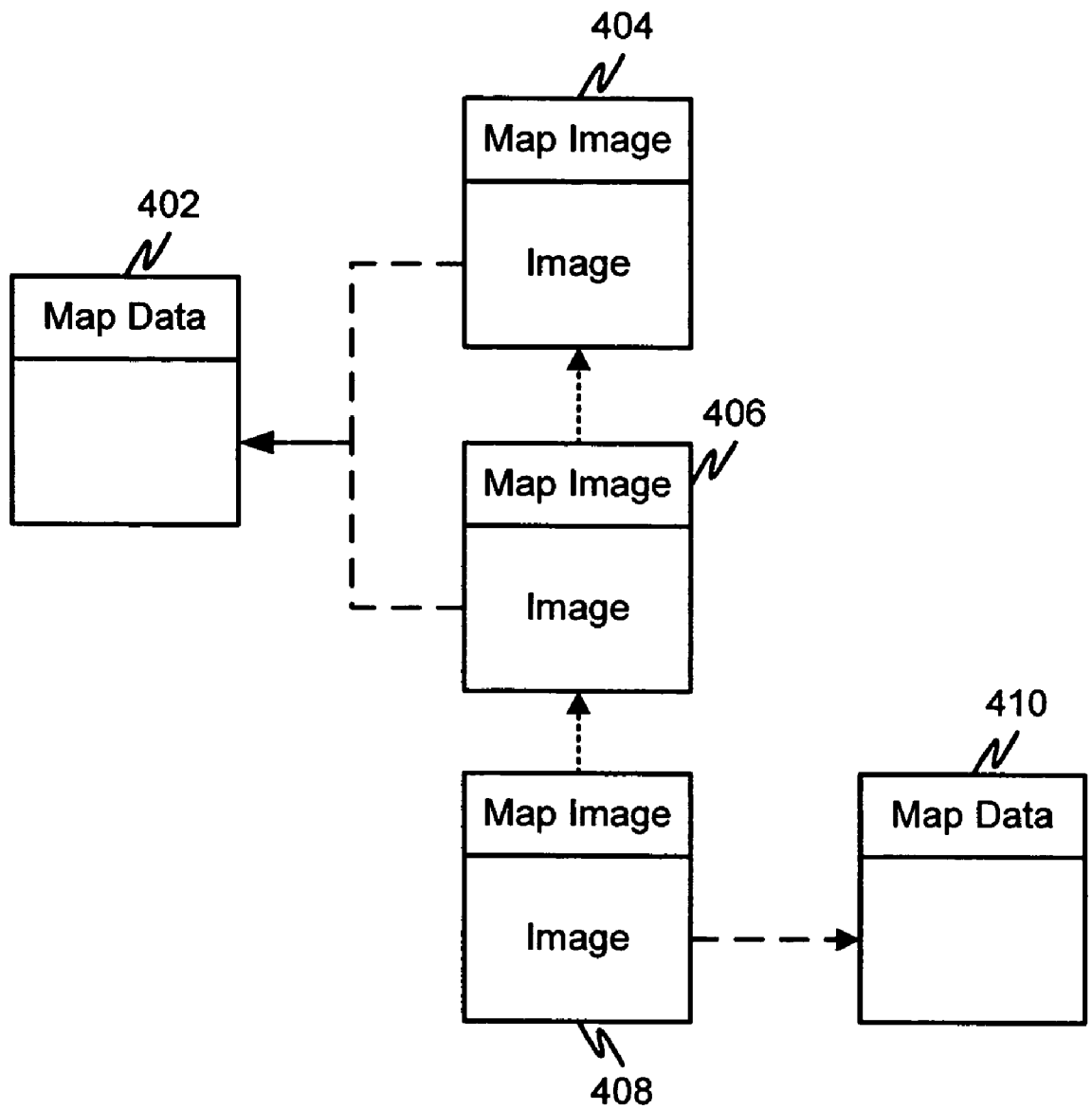
FIG. 4 is a block diagram of an exemplary embodiment of map object connectivity in accordance with the present invention.

FIG. 4 is a block diagram of an exemplary embodiment of map object connectivity in accordance with the present invention. In particular, a first map data object 402 is connected to a first map image object 404 and a second map image object 406. A second map data object 410 is connected to a third map image object 408. The third map image object 408 is connected to the second map image object 406. The second map image object 406 is connected to the first map image object 404.

In operation, the first map image object 404 and the second map image object 406 may be generating different images based on a common map data object 402. While the third map image object 410 may be generating an image based on the second map data object 410.

Figure 5:
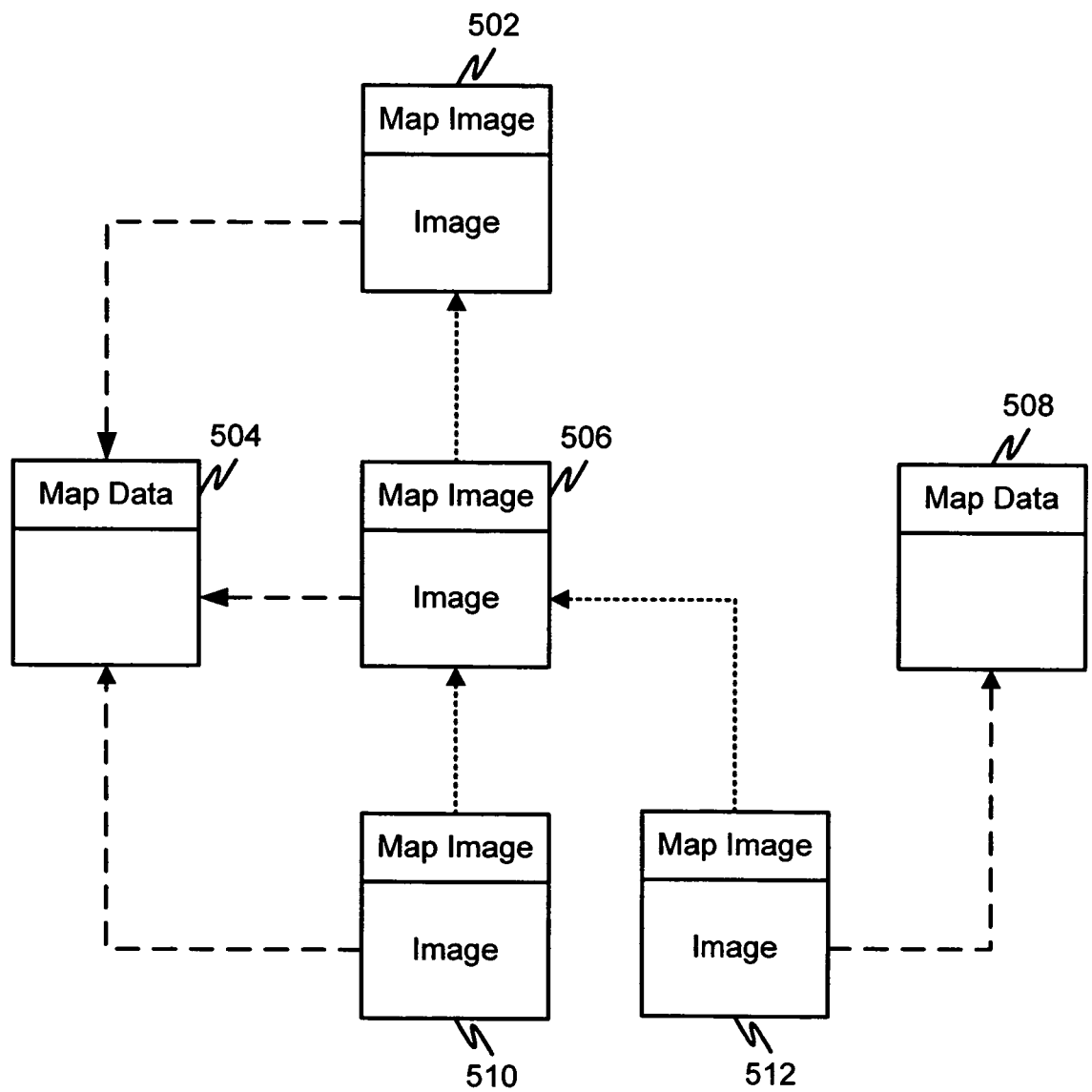
FIG. 5 is a block diagram of an exemplary embodiment of map object connectivity in accordance with the present invention.

FIG. 5 is a block diagram of an exemplary embodiment of map object connectivity in accordance with the present invention. In particular, a first map data object 504 is connected to a first map image object 502, a second map image object 506, and a third map image object 510. A second map data object 508 is connected to a fourth map image object 512. The third map image object 510 and the fourth map image object 512 are connected to the second map image object 506. The second map image object 506 is connected to the first map image object 502.

In operation, three map image objects (502, 506, and 510) may each generate the same or different images based on the first map data object 504. The fourth map image object 512 may be generating an image based on the second map data object 508. The third map image object 510 and fourth map image object 512 generate their respective map image and store them in the memory of the second map image object 506. The second map image object 506 stores a map image in the first map image object 502.

Figure 6:
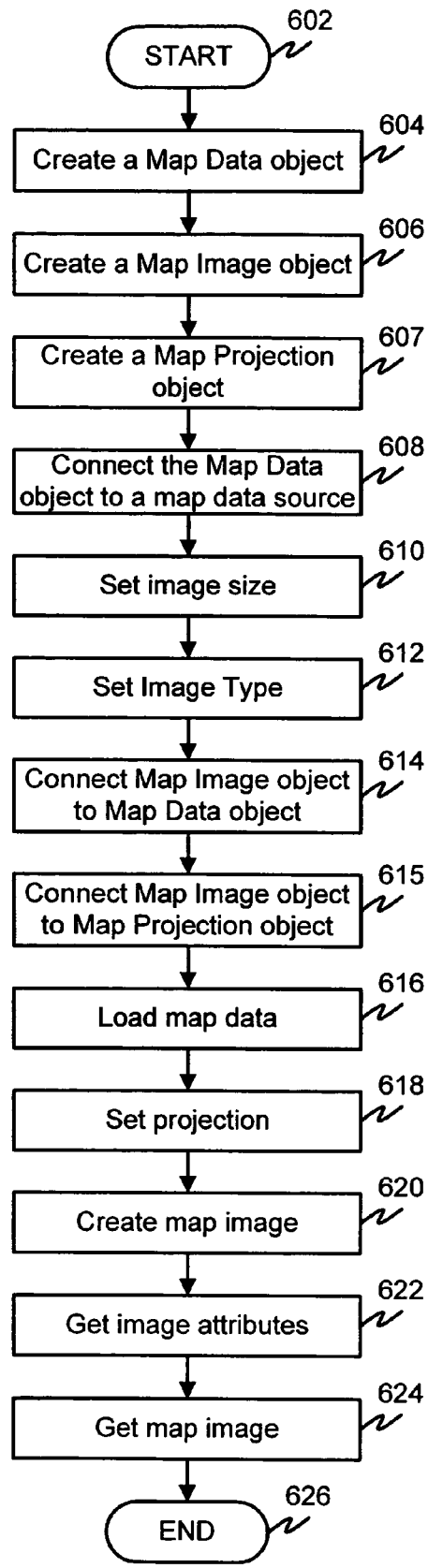
FIG. 6 is a flowchart of an exemplary embodiment of a map object connectivity method in accordance with the present invention.

FIG. 6 is a flowchart of an exemplary embodiment of a map object connectivity method in accordance with the present invention. In particular, control begins at step 602 and continues to step 604.

In step 604, a map data object is created. Control continues to step 606. In step 606 a map image object is created. Control continues to step 607.

In step 607, a map projection object is created. Control continues to step 608. In step 608, the map data object is connected to a map data source. The map data source may be a map database or another map data object previously created. Control continues to step 610.

In step 610, an image size is set. Control continues to step 612. In step 612, an image type is set. Control then continues to step 614.

In step 614, the map image object is connected to the map data object. Control continues to step 615. In step 615, the map image project is connected to the map projection object. Control continues to step 616.

In step 616, map data is loaded from the map data object to the map image object. Control continues to step 618. In step 618, the map image object sets the projection of the map projection object. Control continues to step 620. In step 620, the map image is created. Control continues to step 622.

In step 622, an application program gets the image attributes. Control continues to step 624. In step 624, an application program gets the map image. Control continues to step 626, where the control sequence ends.

The methods and systems for map image object connectivity, as shown in the above figures, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions described herein can be used to implement methods and systems for map image object connectivity according to this invention.

Furthermore, the disclosed system may be readily implemented in software using object or object-oriented software development environments that provide portable source code that can be used on a variety of computer platforms. Alternatively, the disclosed methods and systems for map image object connectivity may be implemented partially or fully in hardware using standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The methods and systems for map image object connectivity illustrated herein can readily be implemented in hardware and/or software using any known or later developed systems or structures, devices and/or software by those of ordinary skill in the applicable art from the functional description provided herein and with a general basic knowledge of the computer and graphics arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated encoding/decoding system, or the like. The system can also be implemented by physically incorporating the system and method into a software and/or hardware system, such as the hardware and software systems of a navigation processor, vehicle control processor, or image processor.

It is, therefore, apparent that there is provided in accordance with the present invention, methods and systems for map image object connectivity. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A method for creating connectivity between map data and a map image in an object oriented computer system, said method comprising the steps of:
    creating a map data object, wherein the map data object comprises a map data connection process and a map data retrieval process;
    creating a map image object, wherein the map image object comprises a map data selection process and a map image rendering process;
    creating a map projection object, wherein the map projection object comprises a map projection process;
    connecting the map data object to a map data source by invoking the map data connection process of the map data object and providing a map data source identifier;
    connecting the map image object to the map data object by invoking the map data selection process of the map image object and providing an identifier corresponding to the map data object;
    creating a map image by invoking the map image rendering process of the map image object; and
    outputting the map image.

2. The method of claim 1, wherein the step of creating a map image by invoking the map image rendering method of the map image object comprises the steps of:
    retrieving map data from the map data source by invoking the map data retrieval process of the map data object; and
    projecting the map data by invoking the map projection process of the map projection object.

3. The method of claim 1, wherein the map image is projected and stored in the map image object.

4. The method of claim 1, wherein the map image is projected and stored in a different map image object.

5. The method of claim 1, further comprising the step of setting an image type attribute of the map image object.

6. The method of claim 1, further comprising the step of setting an image size attribute of the map image object.

7. The method of claim 1, wherein the map data source is a map database.

8. The method of claim 1, wherein the map data source is another map data object.

9. A computer readable medium having software instructions encoded thereon for enabling a computer to provide map image object connectivity in an object oriented environment, the software instructions, when executed, cause the computer to perform a series of predetermined operations including the steps of:

creating a map data object, wherein the map data object comprises a map data connection process and a map data retrieval process;

creating a map image object, wherein the map image object comprises a map data selection process and a map image rendering process;

creating a map projection object, wherein the map projection object comprises a map projection process;

connecting the map data object to a map data source by invoking the map data connection process of the map data object and providing a map data source identifier;

connecting the map image object to the map data object by invoking the map data selection process of the map image object and providing an identifier corresponding to the map data object; and creating a map image by invoking the map image rendering process of the map image object, wherein creating the map image comprises retrieving map data from the map data source by invoking the map data retrieval process of the map data object and projecting the map data by invoking the map projection process of the map projection object, whereby the computer provides map image object connectivity in an object oriented environment.

10. The computer readable medium of claim 9, wherein the map image is projected and stored in the map image object.

11. The computer readable medium of claim 9, wherein the map image is projected and stored in a different map image object.

12. The computer readable medium of claim 9, further comprising the step of setting an image type attribute of the map image object.

13. The computer readable medium of claim 9, further comprising the step of setting an image size attribute of the map image object.

14. The computer readable medium of claim 9, wherein the map data source is a map database.

15. The computer readable medium of claim 9, wherein the map data source is another map data object.

16. A computer system adapted for use on an aircraft comprising:

a processor, and a memory including software instructions that cause the computer system to perform the steps of:

creating a map data object, wherein the map data object comprises a map data connection process and a map data retrieval process;

creating a map image object, wherein the map image object comprises a map data selection process and a map image rendering process;

creating a map projection object, wherein the map projection object comprises a map projection process;

connecting the map data object to a map data source by invoking the map data connection process of the map data object and providing a map data source identifier;

connecting the map image object to the map data object by invoking the map data selection process of the map image object and providing an identifier corresponding to the map data object; and creating a map image on board an aircraft by invoking the map image rendering process of the map image object, wherein creating the map image comprises retrieving map data from the map data source by invoking the map data retrieval process of the map data object and projecting the map data by invoking the map projection process of the map projection object.

17. The computer system of claim 16, wherein the map image is projected and stored in the map image object.

18. The computer system of claim 16, wherein the map image is projected and stored in a different map image object.

19. The computer system of claim 16, further comprising the step of setting an image type attribute of the map image object.

20. The computer system of claim 16, further comprising the step of setting an image size attribute of the map image object.

21. The computer system of claim 16, wherein the map data source is a map database.

22. The computer system of claim 16, wherein the map data source is another map data object.

* * * * *